No. 835,676. PATENTED NOV. 13, 1906.
L. R. GREER.
ATTACHMENT FOR CULTIVATORS.
APPLICATION FILED FEB. 19, 1906.
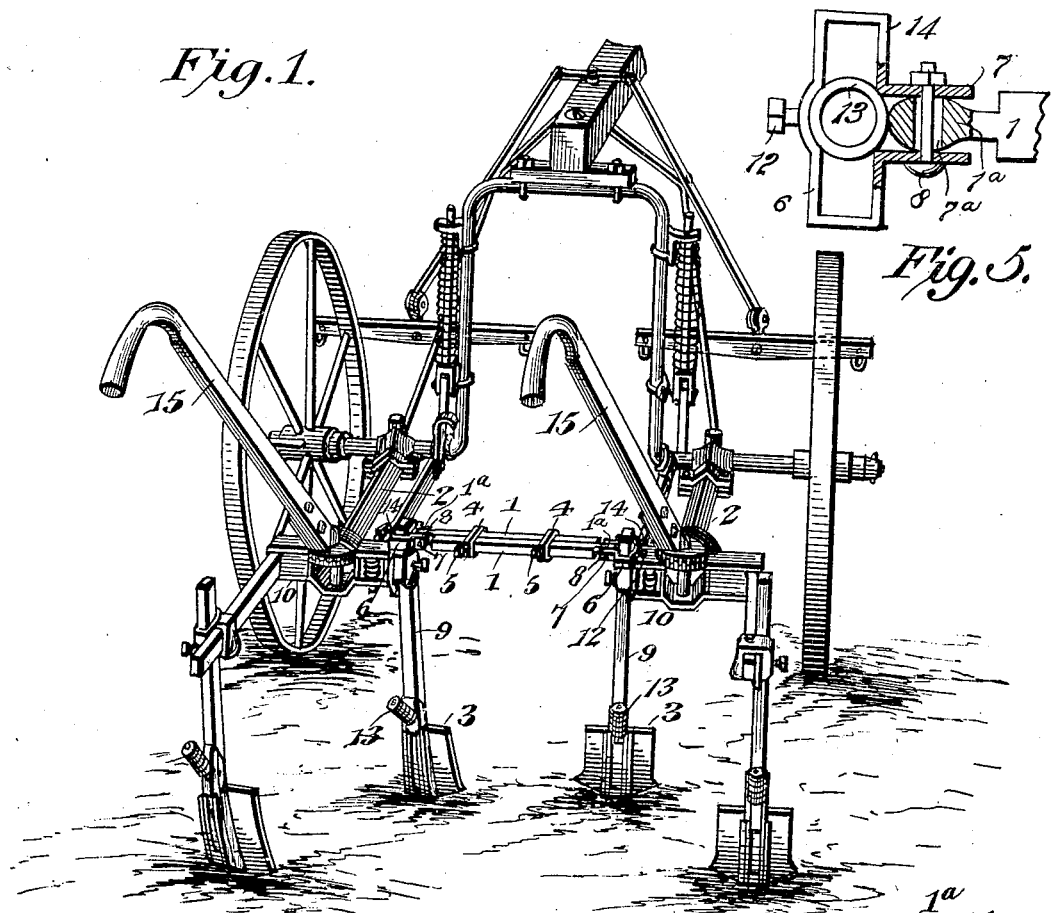
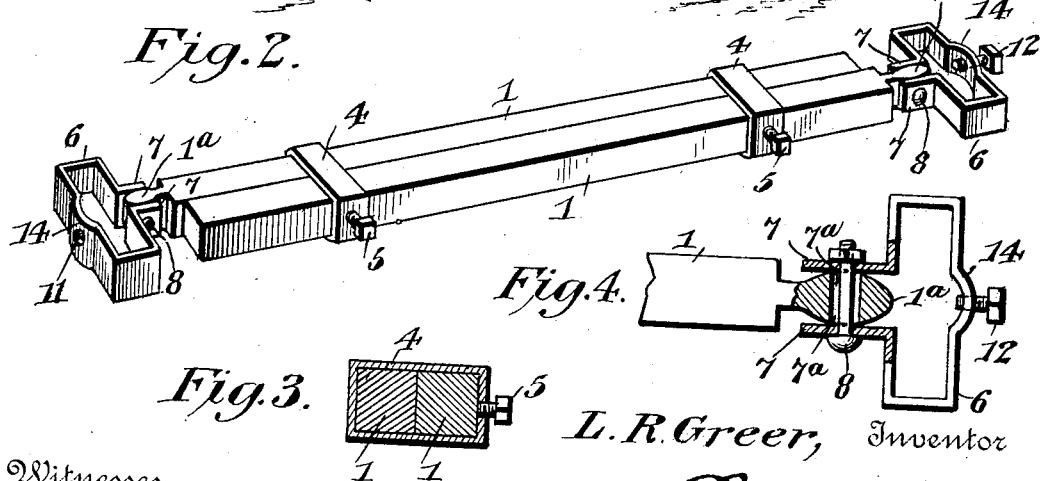
L. R. Greer, Inventor
Witnesses
Attorney

UNITED STATES PATENT OFFICE.

LIMVEL ROY GREER, OF ALBION, ARKANSAS, ASSIGNOR OF ONE-HALF TO EMMET SNIPES, OF ALBION, ARKANSAS.

ATTACHMENT FOR CULTIVATORS.

No. 835,676.　　　Specification of Letters Patent.　　　Patented Nov. 13, 1906.

Application filed February 19, 1906. Serial No. 301,833.

*To all whom it may concern:*

Be it known that I, LIMVEL ROY GREER, a citizen of the United States, residing at Albion, in the county of White and State of Arkansas, have invented a new and useful Attachment for Cultivators, of which the following is a specification.

The invention relates to an attachment for cultivators for connecting the beams thereof for enabling the machine to be more conveniently operated and more easily guided and controlled.

Heretofore considerable difficulty has been experienced in scraping or plowing young cotton-plants and corn with straddle-row cultivators having independently-adjustable beams, as the blades are liable to slip and accidentally injure or destroy the young plants, and it has been practically impossible for boys to perform this labor.

The object of the present invention is to provide a simple, inexpensive, and efficient device adapted to be readily applied to a cultivator at different elevations to clear the plants under cultivation and capable of ready adjustment for spacing the beams of the cultivator the desired distance apart and of maintaining the beams in such spaced relation, whereby the cultivator may be more easily guided and controlled and operated for scraping or plowing young cotton-plants and corn without liability of accidentally destroying the plants.

Another object of the invention is to provide a device of this character adapted to permit limited movement of the beams of a cultivator, so that the cultivating devices of one of the beams may work slightly in advance of the other.

A further object of the invention is to provide a device of this character which may be either applied to the front standards of a cultivator or to the springs at the lower ends of the standards.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a cultivator provided with an attachment constructed in accordance with this invention. Fig. 2 is a perspective view of the attachment. Fig. 3 is a transverse sectional view illustrating the construction of the clamps for adjustably securing the sections or members of the connecting-bar together. Fig. 4 is a detail horizontal sectional view of one end of the attachment. Fig. 5 is a detail view illustrating the manner of securing the attachment to the springs at the lower ends of the standards of a cultivator.

Like numerals of reference designate corresponding parts in all the figures of the drawings.

1 1 designate sections or members of an adjustable connection or connecting-bar which is designed to connect the beams 2 of a cultivator for maintaining the said beams and the cultivator blades or shovels 3 positively in the desired spaced relation, whereby the cultivator may be more conveniently operated and more easily guided and controlled, especially when used for scraping or plowing young cotton-plants and corn. The sections or members, which are designed to be constructed of metal or other suitable material and which are preferably in the form of squared bars, are overlapped, as clearly shown in Fig. 2 of the drawings, and are slidably and adjustably secured together by a pair of clamps 4, consisting of rectangular sleeves conforming to the configuration of the sections or members and provided with clamping-screws 5, mounted in threaded perforations of the sleeves and engaging the adjacent bar or section, as clearly illustrated in Fig. 3 of the drawings. The clamping-screws are preferably provided with square heads to enable them to be operated by a wrench, but any other suitable construction may be employed, as will be readily understood. When the screws are loosened, the sections or members slide freely in the sleeve of the clamps to provide a connection of the desired length, and when the sections or members have been adjusted the screws are tightened and they are securely held by the clamps.

The sections or members are connected at their outer ends with opposite beams of the cultivator by means of substantially oblong loops 6, forming terminal-attaching means constructed of suitable metal and provided at their inner sides with spaced projecting portions or flanges 7, between which the outer ends of the sections or members 1 are secured by bolts or other suitable fastening devices. The outer ends of the sections or members 1 are provided with reduced tongues 1ª, which are rounded longitudinally and oppositely tapered to present convex faces to the spaced projecting portions or flanges 7 of the said loops 6. The bolts 8, which are arranged in horizontal slots 7ª of the tongues 1ª, project beyond the same and have their terminal portions arranged in perforations of the spaced projecting portions or flanges of the loops. This construction permits a limited horizontal rocking or pivotal movement of the outer ends of the sections between the spaced projecting portions or flanges 7 of the loops to provide sufficient play for allowing the cultivating blades or shovels of one of the cultivator-beams to work in advance of the blades or shovels of the other beam.

The oblong loops are adapted to fit over the upper ends of the front standards 9, as clearly illustrated in Fig. 1 of the drawings, and they are adapted to rest upon the cross-heads or portions 10, to which the standards are adjustably secured. The loops are provided at their outer sides with threaded perforations 11 for the reception of clamping-screws 12, which are adapted to engage the standards for clamping the adjustable connection to the same.

The adjustable connection is applied to the upper ends of the standards 9 when the cotton, corn, or other plants have grown to a considerable height, but the adjustable connection is adapted to be mounted on the springs 13 of the front standards when the plants are small. In order to enable the adjustable connection to be readily applied to the springs 13, the loops are provided at their outer sides with outwardly curved or bowed intermediate portions 14, which conform to the configuration of the springs and prevent the loops from slipping backward or forward on the same. The particular construction of the loops at the ends of the attachment enables the latter to be applied either to the front standard 9 or to the springs 10 at the lower ends thereof. The adjustable connection may be carried by the springs while the plants are small, and when the cotton-plants or corn have grown too high for this arrangement the adjustable connection may be transferred to the upper ends of the standard 9.

When the adjustable connection is applied to the cultivator, the beams, which are moved laterally in the usual manner, may be more readily controlled by the operator, as the handle-bars 15, which extend upwardly and rearwardly from the beams 2, will not move independently of each other.

It will be seen that the device is exceedingly simple and inexpensive in construction and that it is adapted to be readily applied to various kinds and styles of cultivators and that it will enable the operation of scraping or plowing young cotton-plants and the corn to be easily performed by either a man or boy.

Having thus fully described my invention, what I claim as new, and desire to secure by Letters Patent, is—

1. An adjustable connection for cultivators composed of substantially oblong loops adapted to fit over the standards of a cultivator, said loops being also provided at their outer sides with outwardly curved or bowed intermediate portions to enable the loops to fit over the springs of a cultivator, adjustable clamping means carried by the curved or bowed portions of the loops for rigidly securing the same to a cultivator, a connecting device extending across the space between the loops, and means located at the inner sides of the loops for connecting the said connecting device with the loops for permitting a limited movement of the same on each other, whereby the cultivating device at one side of the cultivator is permitted to work slightly in advance of the cultivating device at the opposite side.

2. An attachment for cultivators comprising terminal attaching means for connection with the opposite portions of the cultivator, said means being provided with spaced portions, and a connecting device having terminal portions mounted between the said spaced portions of the attaching means for a limited rocking or pivotal movement.

3. An attachment for cultivators comprising terminal attaching means for connection with the opposite portions of a cultivator, said means being provided with spaced projecting portions, and a connecting device having terminal tongues secured between the said spaced projecting portions and presenting substantially convex faces to the same and having a limited rocking movement between said projecting portions.

4. An attachment for cultivators comprising terminal attaching means for connection with the opposite portions of a cultivator, said means being provided with spaced projecting portions, a connecting device having terminal tongues arranged between the said spaced projecting portions and provided with horizontal slots, and fastening devices securing the tongues to the projecting portions and arranged in the slots of the former to permit the tongues to have a limited rocking movement.

5. An attachment for cultivators comprising terminal loops for engaging the opposite portions of a cultivator, said loops being provided at their inner sides with spaced projecting flanges, and a connecting device having oppositely-tapered terminal tongues secured between the projecting flanges and having a limited horizontal rocking movement.

In testimony that I claim the foregoing as my own I have hereto affixed my signature in the presence of two witnesses.

LIMVEL ROY GREER.

Witnesses:
   Jos. L. Figg,
   H. E. Bradley.